(12) United States Patent
Bastide et al.

(10) Patent No.: US 10,397,168 B2
(45) Date of Patent: Aug. 27, 2019

(54) CONFUSION REDUCTION IN AN ONLINE SOCIAL NETWORK

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 212 days.

(21) Appl. No.: 15/252,827

(22) Filed: Aug. 31, 2016

(65) Prior Publication Data

US 2018/0060416 A1 Mar. 1, 2018

(51) Int. Cl.
*G06Q 10/10* (2012.01)
*G06Q 50/00* (2012.01)
(Continued)

(52) U.S. Cl.
CPC .......... *H04L 51/32* (2013.01); *G06F 16/9535* (2019.01); *G06Q 10/10* (2013.01); *G06Q 50/01* (2013.01)

(58) Field of Classification Search
None
See application file for complete search history.

(56) References Cited

U.S. PATENT DOCUMENTS

| 8,688,435 B2 | 4/2014 | Nasri et al. |
| 2009/0164572 A1* | 6/2009 | Charlton ............... G06F 17/241 709/204 |

(Continued)

OTHER PUBLICATIONS

Kiddon, Chloe, et al., "That's What She Said: Double Entendre Identification" [retrieved on Aug. 25, 2016]. Retrieved from the Internet <URL: http://www.aclweb.org/anthology/P11-2016.pdf>. Proceedings of the 49th Annual Meeting of the Association for Computational Linguistics:shortpapers, Portland, OR, Jun. 19-24, 2011. pp. 89-94.

(Continued)

*Primary Examiner* — Charles D Adams
(74) *Attorney, Agent, or Firm* — Michael O'Keefe; Matthew M. Hulihan; Heslin Rothenberg Farley & Mesiti PC

(57) ABSTRACT

Confusion reduction in an online social network. A method identifies elements in social media message content, determines, based on the identified elements, a plurality of candidate audiences to which the social media message content is potentially targeted, indicates, to a user, the plurality of candidate audiences and suggested additional elements to apply to the social media message content to tailor the social media message content to a target audience of the plurality of candidate audiences, and modifies the social media message content with one or more additional elements of the suggested additional elements, the modifying adding the one or more additional elements to the social media message content and targeting the social media message content to the target audience.

13 Claims, 8 Drawing Sheets

(51) Int. Cl.
    *H04L 12/58*       (2006.01)
    *G06F 16/9535*    (2019.01)

(56)           References Cited

U.S. PATENT DOCUMENTS

| | | | |
|---|---|---|---|
| 2009/0327877 A1 | 12/2009 | Slaney et al. | |
| 2011/0295392 A1* | 12/2011 | Cunnington | G06Q 10/10 |
| | | | 700/90 |
| 2012/0102104 A1 | 4/2012 | Kakade et al. | |
| 2013/0254231 A1 | 9/2013 | Decker et al. | |
| 2013/0304455 A1* | 11/2013 | O'Sullivan | G06F 17/241 |
| | | | 704/9 |
| 2014/0279906 A1 | 9/2014 | Peintner | |
| 2014/0359022 A1* | 12/2014 | Buddenbaum | H04L 51/32 |
| | | | 709/206 |

OTHER PUBLICATIONS

"Natural Language Processing", Wikipedia. [retrieved on Aug. 25, 2016]. Retrieved from the Internet <URL: https://en.wikipedia.org/wiki/Natural_language_processing>, page last modified Aug. 20, 2016, 9 pgs.

"IBM SPSS Statistics" [retrieved on Aug. 25, 2016]. Retrieved from the Internet <URL: https://www.ibm.com/marketplace/cloud/statistical-analysis-and-reporting/us/en-us>, 5 pgs.

"SPSS Text Analytics for Surveys" [retrieved on Aug. 25, 2016]. Retrieved from the Internet <URL: http://www-03.ibm.com/software/products/en/spss-text-analytics-surveys>, 2 pgs.

Mell, Peter, et al., "The NIST Definition of Cloud Computing", NIST Special Publication 800-145, Sep. 2011, Gaithersburg, MD, pp. 1-7.

\* cited by examiner

CONFUSION REDUCTION IN AN ONLINE SOCIAL NETWORK

BACKGROUND

Online social networks are the universal mechanism to connect people and information in logical and organized ways, enabling sharing and processing of information between the social network users. The most common mechanism of sharing and processing information is the user wall, activity stream, timeline, or profile. These mechanisms enable the user to rapidly share information with others and gather information from others in the user's network(s). However, as the mix of languages, online vernacular, and different types of markups applied in social media posts increases, the opportunity for confusion in social media posts increases.

SUMMARY

Shortcomings of the prior art are overcome and additional advantages are provided through the provision of a computer-implemented method. The method identifies elements in social media message content. The method also determines, based on the identified elements, a plurality of candidate audiences to which the social media message content is potentially targeted. Additionally, the method indicates, to a user, the plurality of candidate audiences and suggested additional elements to apply to the social media message content to tailor the social media message content to a target audience of the plurality of candidate audiences. The method modifies the social media message content with one or more additional elements of the suggested additional elements, the modifying adding the one or more additional elements to the social media message content and targeting the social media message content to the target audience.

Further, a computer program product including a computer readable storage medium readable by a processor and storing instructions for execution by the processor is provided for performing a method. The method identifies elements in social media message content. The method also determines, based on the identified elements, a plurality of candidate audiences to which the social media message content is potentially targeted. Additionally, the method indicates, to a user, the plurality of candidate audiences and suggested additional elements to apply to the social media message content to tailor the social media message content to a target audience of the plurality of candidate audiences. The method modifies the social media message content with one or more additional elements of the suggested additional elements, the modifying adding the one or more additional elements to the social media message content and targeting the social media message content to the target audience.

Yet further, a computer system is provided that includes a memory and a processor in communications with the memory, wherein the computer system is configured to perform a method. The method identifies elements in social media message content. The method also determines, based on the identified elements, a plurality of candidate audiences to which the social media message content is potentially targeted. Additionally, the method indicates, to a user, the plurality of candidate audiences and suggested additional elements to apply to the social media message content to tailor the social media message content to a target audience of the plurality of candidate audiences. The method modifies the social media message content with one or more additional elements of the suggested additional elements, the modifying adding the one or more additional elements to the social media message content and targeting the social media message content to the target audience.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are facilities for confusion reduction in social media messages of online social networks. As noted, as the mix of languages, online vernacular, and different types of markups applied in social media posts increases, the opportunity for confusion in social media posts increases. Hashtags (#), 'at' mentions (@), goals ($), and many other symbols/markup have the potential to be misconstrued and/or subverted into a higher order grammar. By way example, a user might post a comment "Awesome Donuts" about donuts that the user is eating. However, the post does not convey that it is about the food item. It could instead refer to the vehicular maneuver sometimes performed by racecar drivers. Without further information provided in/with the post, readers might assume the user is referring to the vehicular maneuver rather than a donut that the user is eating. If USER1, USER2 and USER3 are members of a social network and USER1 posts "Awesome Donuts", USER2 might assume USER1 is referring to the food item, USER3 might assume USER1 is referring to the vehicular maneuver, and USER1 may actually be referring to one of these or a different meaning of 'donut'. another example, an original word or phrase used as a hashtag with a specific connotation may be subverted to a new intent based on users misusing the hashtag in the manner for which it was originally intended. The hashtag trend may start with use for one purpose that is subverted for another purpose. The confusion that results is in the continued use of the hashtag, potentially resulting in different (unintended) meanings to others. Additionally, mixing two or more spoken languages or markup types (hashtags, mentions, etc.) is becoming more common and can further lead to confusion without enough context.

Figure 1:
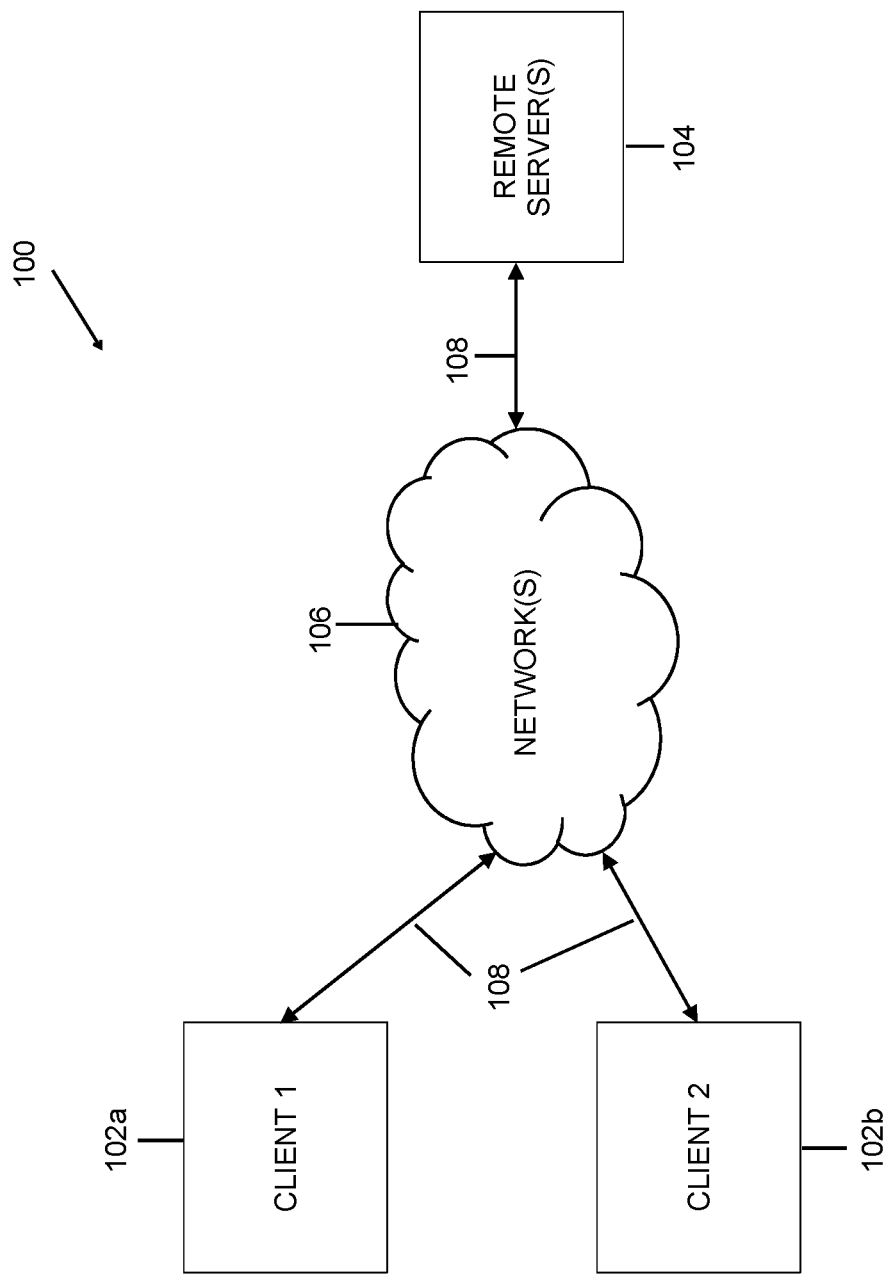
FIG. 1 depicts an example environment to incorporate and/or use aspects described herein.

FIG. 1 depicts an example environment to incorporate and/or use aspects described herein, such as an environment in which users interact with a social media platform. Client computer systems 102a, 102b communicate via one or more intervening networks 106 with a social media platform hosted by remote computer system(s)/server(s) 104. Clients 102a, 102b are in communication with network(s) 106 and remote server(s) 104 via wired or wireless communications links 108, such as wired and/or cellular, Wi-Fi, or other types of wireless connections. More generally, communications links 108 may be any appropriate wireless or wired communication link(s) for communicating data.

Clients 1 and 2 are computer systems of users of a social network hosted by remote server(s) 104. By way of specific example, client 1 102a is computer system, such as a smartphone or other mobile device, running client software, such as a web browser or mobile app, with which USER1 interacts to compose and submit a post to server(s) 104 for posting to the user's social media network activity stream or wall. The post content is transmitted by client 102a across network(s) 106 to one or more servers 104. The server(s) receive the message, optionally perform processing described herein to modify the post content, and commit the (modified) post to the user's activity profile, for instance by saving the post content to a database or other data structure for retrieval. The profile is served by one or more server(s) 104 for viewing and/or interaction by users of the social network. Client 2 102b is another computer system of a USER2 that is friends with USER 1 in the social network. The post may be visible to USER2—that is client software, such as a web browser or mobile app running on client 2 102b, accesses the social network hosted by remote server(s) 104. The server(s) 104 serve the post content to client 2 102b, which displays the post content for USER 2 to view USER1's activity profile including the modified post previously committed to USER1's activity stream.

Example online social networks and/or providers enabling wall or activity stream functionality include MySpace® (a registered trademark of Myspace LLC, Beverly Hills, Calif., U.S.A.), Facebook® (a registered trademark of Facebook, Inc., Menlo Park, Calif., U.S.A.), IBM Connections (a trademark of International Business Machines Corporation, Armonk, N.Y., U.S.A.), Yammer (a trademark of Yammer, Inc., San Francisco, Calif., U.S.A.), Path (a trademark of Path Mobile Inc Pte. Ltd., San Francisco, Calif., U.S.A.), Jive® (a registered trademark of Jive Software, Inc., Palo Alto, Calif., U.S.A.), Google Circles, Diaspora® (a registered trademark of Diaspora Inc., San Francisco, Calif., U.S.A.), SocialGo® (a registered trademark of SocialGO Plc, Shoreditch, London, United Kingdom), LinkedIn® (a registered trademark of LinkedIn Corporation, Mountain View, Calif., U.S.A.), Microsoft® (a registered trademark of Microsoft Corporation, Redmond, Wash., U.S.A.), Flickr® (a registered trademark of Yahoo! Inc., Sunnyvale, Calif., U.S.A.), and YouTube® (a registered trademark of Google Inc., Mountain View, Calif., U.S.A.). Example collaboration/email providers with which aspects described herein may be used are Gmail® offered by Google Inc. (of which GMAIL is a registered trademark), Exchange® offered by Microsoft Corporation (of which EXCHANGE is a registered trademark), and Notes®/Domino® offered by International Business Machines Corporation (of which NOTES and DOMINO are registered trademarks).

Aspects described herein facilitate augmentation of original or intended social media message content (e.g. posts or other messages such as comments to posts, likes, etc.) with additional elements. The message is then sent/posted or resent/reposted after the augmentation/modification. The additional elements can provide context for the original post, reducing potential confusion to enable others who read the post to better understand what the post is about. The post content may be automatically analyzed to determine two or more different candidate audiences to which the post might be targeted. If it is highly likely that the message content unambiguously applies to only a single identifiable audience, the content may be posted without modification. However, in some cases, like the example above where the user posts about "donuts" without providing additional elements, aspects described herein can determine that there are multiple candidate audiences (e.g. foodies and racing fans) potentially targeted by the post, and thus the potential for confusion among the viewers of the post as to the true meaning of the post. By enabling the posting user to select the augmentations and modify the message, potential confusion on the part of the viewers of the post may be avoided by the additional clarity that the augmentations provide.

Confusion related to a user's post may be reduced via aspects described herein that include:
 analyzing the post's content including the related markup;
 determining the potential different candidate audiences;
 alerting the post's author to possible candidate audiences; and
 modifying the post's content and/or related markup for clarity to convey a more contextual meaning and get a more specific response from the appropriate candidate audience. A post of "Awesome Donuts" in the food sense may be directed to the 'foodie' audience, whereas the same post in the vehicular maneuver sense may be directed to the racing audience.

Thus, processes described herein can provide suggestions to a user as to additional elements, such as hashtags or @mentions (as examples), unique to each of the potential candidate audiences for selection, enabling the user to more appropriately provide context for the post.

Aspects can predict a likelihood of confusion based on the content, related markup, location and/or context of the message content. Context for a message may be based on a combination of the age of the post and the structure of the post (markup, hashtag, goal). Additional aspects include automatically creating separate conversations for each of the identified candidate audiences, merging the separate conversations back into a single conversation in the future if desired, and limiting subtext of online conversations.

Confusion resulting from online grammar and markups in social media message content, a problem unique to the computer environment, can be addressed by aspects described herein that provide channels for clear communication with a target group/audience while maintaining a posts visibility (e.g. making sure it is visible and understandable to the people who care about it), and enhancing memory recall by injecting sufficient context into the post. Additionally, the augmentations help ensure rich social data that can be more readily data-mined.

Working with the above-described example, assume that USER1 is a member of a social network and USER1 posts (on a wall, as a status update, comment, or reply, etc.) via a computer system "Awesome Donuts". This post, either prior to the social network platform displaying the post for others or at some time after the post goes live, is detected and analyzed by USER1's computer system or a computer system supporting/providing the social network platform, as examples. This analysis identifies elements in the post. Then, the process determines candidate audiences based on the identified elements. In the example of USER1's post, two candidate audiences are identified: Experience (referring to the racing example of a vehicular maneuver) and Foodie.

Figure 2:
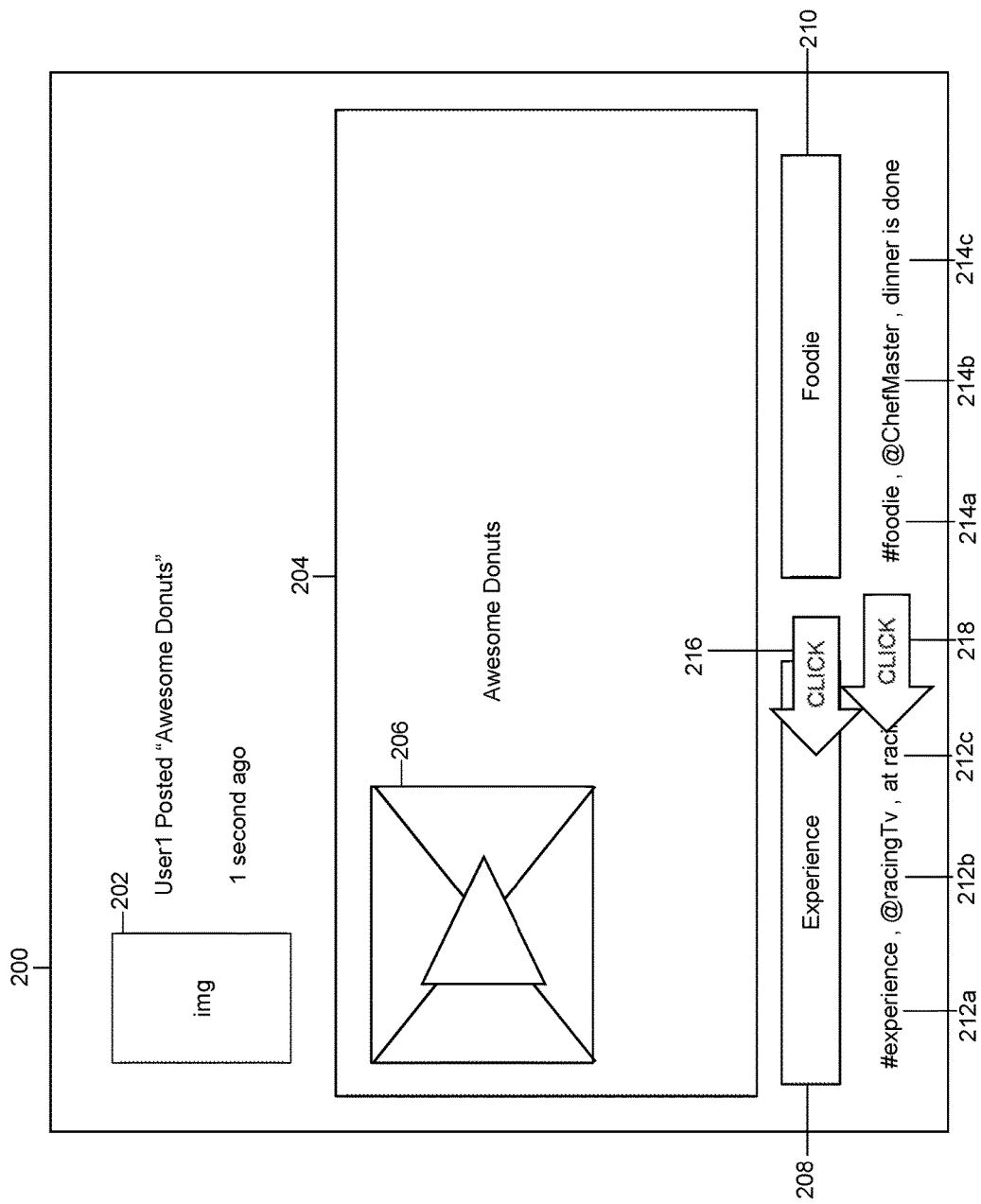
FIG. 2 depicts an example interface presenting candidate audiences and suggested additional elements for selection to modify social media message content, in accordance with aspects described herein.

USER1 is then presented with an interface on the computer system with which she interacts as to the candidate audiences and corresponding potential additions to the post that make the post more specific. FIG. 2 depicts an example such interface presenting candidate audiences and suggested additional elements for selection to modify social media message content, in accordance with aspects described herein. Interface 200 indicates that USER1 posted (or is attempting to post) "Awesome Donuts". Image area 202 includes a space for a related image, such as USER1's profile image or an image that USER1 selects to provide are part of the post. The interface displays the post in portion 204, which in this example includes portion 206 for a video or other media to be posted along with the text "Awesome Donuts". In accordance with aspects described herein, processing identifies elements in USER1's content—the words "awesome" and "donuts"—and determines candidate audiences Experience (corresponding to 'donut' the vehicular maneuver) and Foodie (corresponding to 'donut' the food item). Interface 200 includes interactive interface elements 208 and 210 for Experience and Foodie, respectively, which are clickable/selectable buttons in this example. Suggested additional elements corresponding to the Experience candidate audience are #experience 212a, @racingTv 212b (referring to a television channel dedicated to racing events), and the string 'at racetrack' 212c. These suggested additional elements are elements that USER1 can select and add to the "Awesome Donuts" post. Suggested additional elements corresponding to the Foodie candidate audience are #foodie 214a, @ChefMaster 214b (representing the handle of a famous chef), and string 'dinner is done' 214c, which are elements that USER1 can select an add to the "Awesome Donuts" post.

USER1 selects one or more additional elements with which to modify the post by clicking the interface element corresponding to her intended candidate audience, and selecting appropriate additional element(s) with which to modify the post. In the example of FIG. 2, USER1 modifies the post by clicking (indicated by 216) on the button 208 for the Experience candidate audience, and then clicking (indicated by 218) on the set of related sub-elements 212a-212c. In this particular example, selection 218 selects the group of elements 212a-212c (#experience, @racingTv at racetrack) to modify the post. Processing would then modify the post to read, in this example, "Awesome Donuts at racetrack #experience @racingTv", which targets the post to the target audience, i.e. candidate audience Experience (corresponding to the 'donut' vehicular maneuver on a racetrack). It is noted that in this example the elements 212a-212c are treated as a unit such that the post is augmented with all three upon USER1's selection (218) of the group. In other examples, the individual elements 212a-212c may be individually selectable and applicable to the post. As an example, USER1 may select to modify the post with only the @racingTv additional element 212b. Additionally, in this particular example, the modification to the post includes each of the elements 212a-212c in an order that is slightly different from the order in which they appear in FIG. 2. That is, the string "at racetrack" is moved to immediately follow the Awesome Donuts text, which is done for readability—"Awesome Donuts at racetrack #experience @racingTv". Additionally or alternatively, the user performing the selections could specify the order in which the post elements and additional elements are to appear, for instance by clicking and dragging the additional elements to the desired position, and/or by appending the additional elements to post in the sequence in which the user selects the additional elements from the interface.

With the modification described above to USER1's attempted post of "Awesome Donuts" to read "Awesome Donuts at racetrack #experience @racingTv", viewers of the post, such as USER1's friends USER2 and USER3, know that USER1 is talking about the experience of donuts, the vehicular maneuver, performed by racecars. Additionally, the added markup will increase visibility of the post to the target audience, i.e. those users who may be interested in racing, donut maneuvers, and racetracks.

To illustrate additional aspects, assume again that USER1 is a member of a social network and posts (or submits for posting) "Awesome Donuts #donut_tuesday". This post can be broken down into segments or elements, such as "awesome" "donuts" and the hashtag "donut_tuesday". The use of a hashtag in posts creates an open communication channel, allowing the platform to filter messages directed to this communication channel. Process(es) running on social network server(s) and/or other computer system(s) detect the post from USER1, extract and analyze the post, and find a hashtag—#donut_tuesday in this example. Additionally, process(es) extract a subset of the social network communication related to the hashtag, for instance all of the messages in the system related to that channel, perhaps bounded to a timeframe or other parameter. That enables the system to focus on messages that are part of the communication channel #donut_tuesday. For instance, assume that user USER4 recently posted "Date night on #donut_tuesday" and user USER5 recently posted "With Good Friends @USER1 and @USER3, the food rocks. #donut_tuesday". Both recent posts are part of the communication channel #donut_tuesday. The process can then identify the other elements in those posts, e.g. "Date night on" or "With good friends @USER1 and @USER3" and potentially present them as additional elements selectable by USER1 to augment her post if desired. In some examples, such additional elements are presented for potential selection merely because they included the same hashtag that USER1 used in her post.

In another example of identifying potential additional elements, the system when filtering posts by others for potential additional elements to suggest to the user can correlate separate instances of similar or related posts, potentially those made by separate users. If users R, S, and T are all at a common gathering and post updates that are substantially similar, the system can treat those otherwise isolated posts as a single instance of that communication, which may useful in terms of suggesting and prioritizing which identified additional elements should be presented to a user (USER1) who posts a new message apparently related to that gathering.

Returning to the example above, process(es) can select the unique words/phrases from the posts of USER4 and USER5: Date Night from USER4's post and Good Friends, @USER1, @USER3 from USER5's, and identify those as additional elements to present to USER1 for modifying her post. Thus, USER1 can modify her post to "Awesome Donuts #donut_tuesday with good friends @USER1 @USER3 @USER5". Viewers of the social network post can more clearly understand the context of the post and share a more complete understanding of it.

Social media message content modification as described herein can occur in any type of environment that enables messaging. Examples described herein are presented with reference to online social networks, such as Facebook®, IBM Connections, or Jive®, including asymmetric "I follow" networks like Twitter® (a registered trademark of Twitter, Inc., San Francisco, Calif., U.S.A.) and Instagram® (a registered trademark of Instagram LLC, San Francisco, Calif., U.S.A.), and symmetric "I connect" networks like Facebook® and IBM Connections. Other example environments include other applications like project management, email, and forum applications that provide commenting, updates and/or messaging that are visible by people.

Communications in such online social networks or other software can include both mixed use of natural languages and mixed use of symbols:
  Mixed symbols example—@USER2 #work
  Mixed use of natural language example—Blended Spanish and English phrase
  Combination example—@ USER2 #Spanish Adjective/English Noun In accordance with aspects described herein, a process running on a computer system detects an existing post or attempted post. This can be achieved in any desired manner. Examples include:
  a Document Object Model hook in a web browser or other application from which the post is composed and submitted by the user;
  Compliance Eventing—Social networks include a messaging pipeline behind the scenes. When a client composes and submits a post, the message is routed to a pipeline/farm and usually stored there temporarily. Compliance eventing hooks into this backend architecture to alert of a new post. Typically, compliance eventing would intercept the message and send it to a compliance engine for identification of potentially sensitive content. The platform can then prevent the display of the message and/or mark it for deletion. All of this can occur prior to the post being made visible. Alternatively, compliance eventing can run asynchronously in which messages are posted in real time (or near real time) and compliance-checked after the post. In any event, processing described herein can be triggered in this manner; and
  Polling of the feeds of posts to detect the messages after they are posted.

After detecting/selecting a post, its content (natural language, #hashtags, @mentions, context such as location, time, date, etc.) is parsed and extracted. The natural language or content may be converted into N-Grams (e.g. unigram, bigram, trigram), more complex parse trees, and/or natural language capabilities in order to identify the elements of the post.

The identified elements may be used as part of a key or search parameter in determining potential candidate audiences. Determining candidate audiences can proceed by partitioning the network via any desired approach. For instance, initially, processing builds a dictionary for each of the users in the social network. Each user has a corresponding dictionary of elements (language/words) used. Over time and across posts made by the user, the user-specific dictionary is built indicating language/words that the user has used including frequently used language/words. As part of this, a weight distribution may be assigned to elements used in the prior message. If the user has posted "the cat" and "the party", the distribution is "the"—2, "cat"—1 "party"—1. The weights of the prior-used elements may be used in partitioning the network into candidate audiences. Based on similarity in element usage, groupings are ascertained to suggest elements back the user posting the initial message, and the weights inform prioritized suggestions for augmenting the message. For instance, processing can build a clustered representation of the network using k-means clustering. k can be any number, though in some examples k<10, and specifically k=2 or k=3. The identified clusters can then be converted into partitions. The partitioned network may present a sample of the potential candidate audiences to the user.

Processing queries the message space of the social network based on the extracted content of the post and identifies the user related to the extracted content. It identifies the dense-k clusters in this extracted content and partitions based on a single word, N-Gram, #hashtags, @mentions, or other context, as examples. The query may be within any desired scope, such as a single user's or organization's network, friends of friends space, or the entire social network, as examples. Processing extracts the users and the most frequently (and unused) content. In this regard, some tags can lose their impact, e.g. over time. 'Unused" here refers to examining less frequently used tags.

Processing alerts the user making the post to the identified candidate audiences. It can present candidate audiences inline to the message or as a popup, as examples. Additionally or alternatively, it can present related content as additional elements (strings, @mentions, #hashtags, etc.) available for selection. The user can then select the target audience from the candidate audiences, and select the textual content, including any additional elements as desired, to use in building the final post for posting.

The suggested additional elements are in some examples identified from trending topics or people. Some social networks identify trending topics. Additional elements to suggest to the user could be pulled from this list and filtered based on content of user's initial message. In some examples, this is done dynamically after the user affirmatively identifies the target audience through a selection (e.g. 216 of FIG. 2). If the to-be-posted message is about donuts the food item as ascertained by the user selecting the Foodie candidate audience, trending topics dealing with racing or basketball would be filtered out as potential additional elements to suggest. Instead, the trending topics identified as related to food could be presented to the user, such as topics about cooking shows, foodies, for famous chefs.

Based on the user selection(s), the initially composed post is modified to more clearly associate the post with a target audience. The post is modified with the selected additional elements, which may be appended, prepended and/or interlaced with the initial post content.

In some aspects, a level of confusion of a post is ascertained and used to determine whether processing is to be applied to suggest candidate audiences and additional elements, for instance in order to reduce the level of confusion. The age of a post may be a factor in determining or predicting the level of confusion, as older posts may be more confusing than newer posts because older posts are farther removed temporally from their initial context.

When aspects described herein are applied against already-posted content, time-based, user-based, and/or other prioritization can be applied to prioritize the order in which this confusion reduction processing is to be applied to previously-posted content.

Accordingly, confusion reduction in social network and other messaging environments is provided through identification and selection of target audiences and additional elements with which to modify a message that is posted or to-be-posted. Aspects parse the nuances that help describe the context of the post and modify the post in a way that preserves and clarifies the original context. Processing may be activated at the writing of the post, the attempted posting of the post, or after the post is posted, perhaps based on the views or popularity of the post by viewers/subscribers of those who are connected, as examples.

Further aspects can observe the language, grammar, syntax, diction, tense, etc. of the post to determine the likelihood of confusion and/or desire to activate the processing for modifying the post according to aspects described herein.

In some aspects, if it is determined that a post may be too general in that its context may be unclear, for instance "great time tonight", aspects can prompt the user to add more detail and/or suggest candidate audiences and associated additional elements with which to modify the post. Such suggestions may be based on prior of the elements of the post, both by the user and by other users who may be included in candidate audiences.

Figure 3:
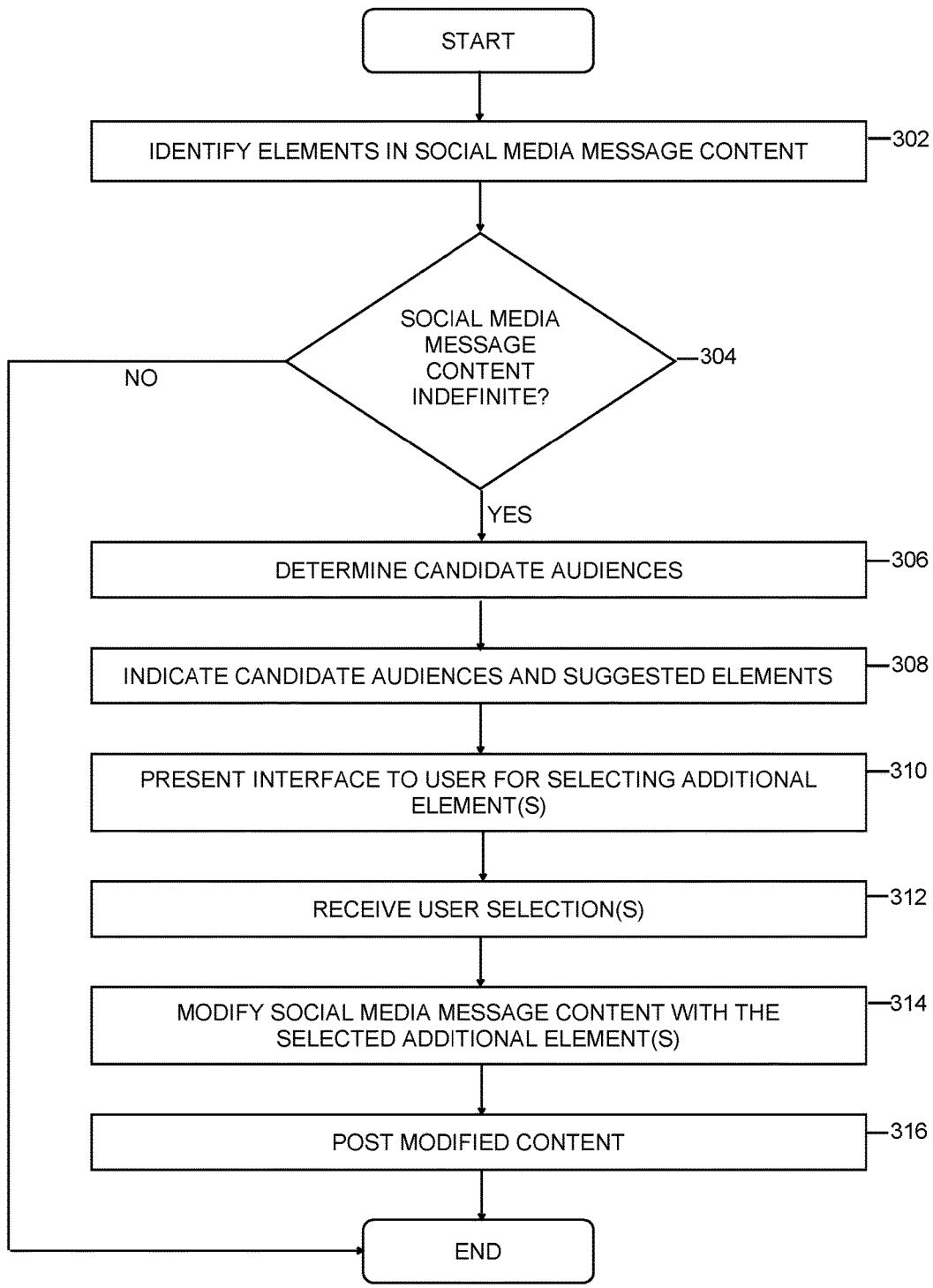
FIG. 3 depicts an example process for confusion reduction in an online social network, in accordance with aspects described herein.

Accordingly, facilities are described herein for confusion reduction in an online social network. FIG. 3 depicts an example process for confusion reduction in an online social network, in accordance with aspects described herein. The process of FIG. 3 may be performed by one or more computer system(s), such as social network platform server or a client computer system (such as a smartphone, tablet, or personal computer) interacting with a social network platform server, or a combination of the foregoing.

The process of FIG. 3 begins by identifying elements in social media message content (302). Such social media message content can include messages being composed for posting but not yet posted to the user's profile, wall, activity stream, or the like. Examples of social media message content include a social media post, a comment to a social media post, a message between users in a social media platform, and a forum post. The identified elements in the social media message content can include natural language elements and one or more metadata tags (#, @ etc.) of the social media message content.

The process also determines whether the social media message content is indefinite as to the target audience (304). Determining whether the social media message content is indefinite as to the target audience can include predicting a likelihood of confusion based on the social media message content. In examples wherein the social media message content includes a posted message posted to a social media platform, the prediction of the likelihood of confusion may be based on an age of the posted message. If the social media message content is not indefinite as to the target audience, the process ends (with posting the social media message content as is, for instance).

Otherwise, if the social media message content is determined to be indefinite, the process determines, based on the identified elements, candidate audience(s) to which the social media message content is potentially targeted (306). An example process for determining candidate audiences is described below with reference to FIG. 3. The candidate audiences and suggested additional elements are indicated to a user for potential use in applying to the social media message content (308), in order to tailor the social media message content to the target audience of the determined candidate audiences. At least one of the suggested additional elements for a candidate audience can include a metadata tag, as an example.

The process presents an interface through which the user selects one or more additional elements (of the suggested additional elements) (310). The interface can present selectable indications of the plurality of candidate audiences, and, for each audience of the plurality of candidate audiences, a plurality of selectable potential additional elements to augment the social media message content to target the social media message content to the target audience.

The process receives via the interface user selections of the one or more additional elements (312) with which to modify the social media message content, and, based on receiving these user selections, modifies the social media message content with the one or more additional elements of the suggested additional elements (314). The modifying can add the one or more additional elements to the social media message content to augment the social media message content with the user selections of the additional elements, and target the social media message content to the target audience. The process then posts the modified content (316), for instance stores, associates, commits, etc. the post to the posting user's profile, activity stream, or wall, enabling other users/user client devices to retrieve, receive and view the modified post content.

In some examples, the social media message content includes a message not yet posted to a social media platform for which the social media message content is composed. The process in this scenario can include performing the modifying of the social media message content prior to posting the social media message content as the message to the social media platform.

Additionally, processing can identify a communications channel (such as a hashtag) in the social media message content, then obtain at least some of the suggested additional elements from other messages identifying the communications channel.

Figure 4:
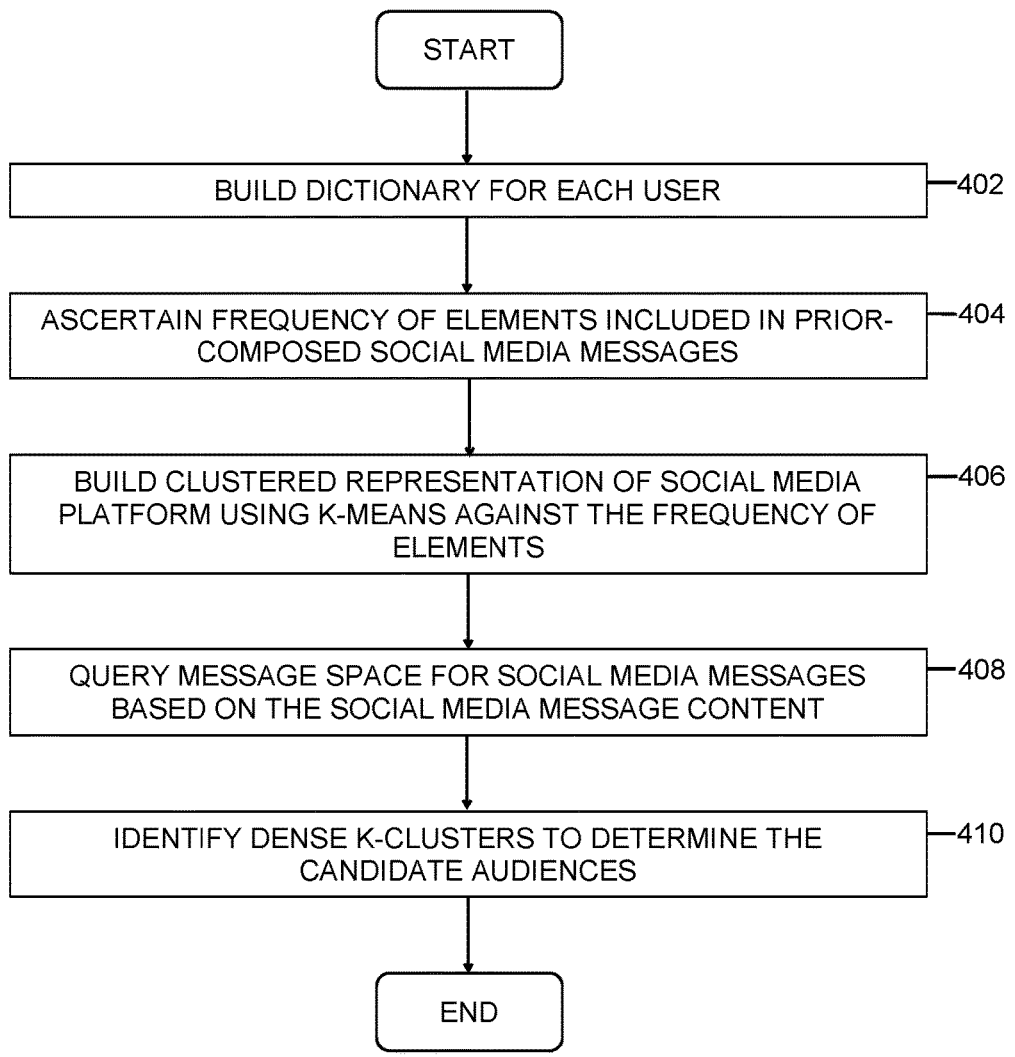
FIG. 4 depicts an example process for determining candidate audiences to which social media message content is potentially targeted, in accordance with aspects described herein.

FIG. 4 depicts an example process for determining candidate audiences to which social media message content is potentially targeted, in accordance with aspects described herein. The process includes building a respective dictionary for each user of a plurality of users of a social media platform in which the social media message content is composed (402). A dictionary for a given user of the plurality of users can include elements included in prior-composed social media messages composed by the given user. The process ascertains a frequency of the elements included in prior-composed social media messages composed by each user (404) and builds a clustered representation of the social media platform using k-means against the frequency of the elements (406). The process also queries a message space for social media messages, based on the social media message content (408). As an example, the process queries to identify messages with content related to the post to be augmented with the additional element(s) and based on the elements of the post to be augmented. The process additionally identifies dense k-clusters based on the social media message content, the dense k-clusters corresponding to the plurality of candidate audiences (410).

Figure 5:
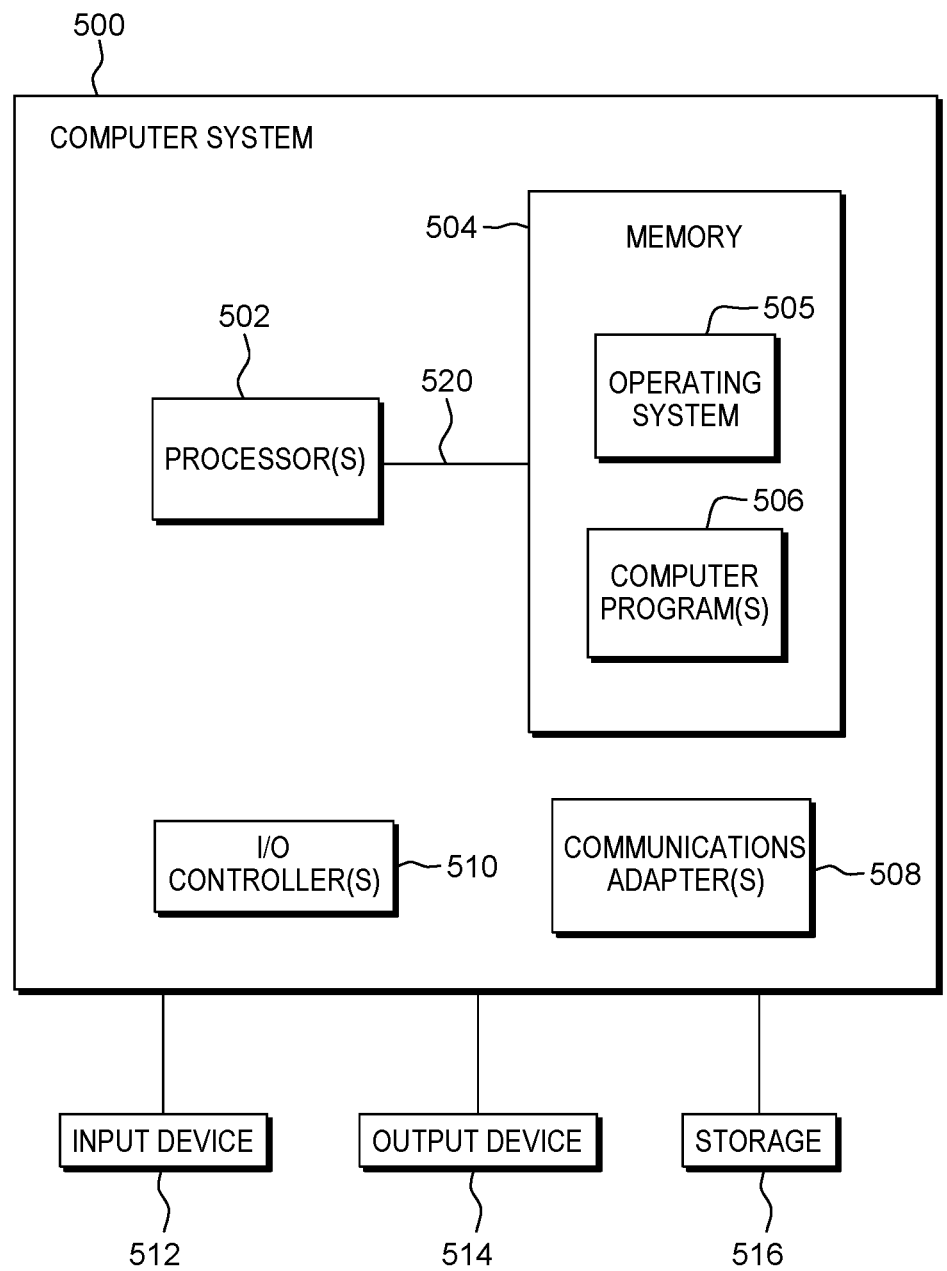
FIG. 5 depicts an example of a computer system to incorporate or use aspects described herein.

Processes described herein may be performed singly or collectively by one or more computer systems, such as client computer systems used by users to compose and post social media messages, server or backend computers providing a social network platform with which such client computers interact, or a combination of the foregoing. FIG. 5 depicts one example of such a computer system to incorporate and/or use aspects described herein. A computer system may also be referred to herein as a data processing device/system or computing device/system/node, or simply a computer. Computer system 500 may be based on one or more of various system architectures such as those offered by International Business Machines Corporation (Armonk, N.Y., USA), Intel Corporation (Santa Clara, Calif., USA), or ARM Holdings plc (Cambridge, England, United Kingdom), as examples.

Computer system 500 is suitable for storing and/or executing program code and includes at least one processor 502 coupled directly or indirectly to memory 504 through, e.g., a system bus 520. In operation, processor(s) 502 obtain from memory 504 one or more instructions for execution by the processors. Memory 504 may include local memory employed during actual execution of the program code, bulk storage, and cache memories which provide temporary storage of at least some program code in order to reduce the number of times code must be retrieved from bulk storage during program code execution. A non-limiting list of examples of memory 504 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 504 includes an operating system 505 and one or more computer programs 506, for instance programs that can execute to perform aspects described herein, such as those described with reference to FIGS. 3 and 4, as examples.

Input/Output (I/O) devices 512, 514 (including but not limited to displays, microphones, speakers, accelerometers, gyroscopes, magnetometers, light sensors, proximity sensors, GPS devices, cameras, etc.) may be coupled to the system either directly or through I/O controllers 510.

Network adapter(s) 508 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 508 used in computer systems.

Computer system 500 may be coupled to storage 516 (e.g., a non-volatile storage area, such as magnetic disk drives, optical disk drives, a tape drive, etc.), having one or more databases. Storage 516 may include an internal storage device or an attached or network accessible storage. Computer programs in storage 516 may be loaded into memory 504 and executed by a processor 502 in a manner known in the art.

The computer system 500 may include fewer components than illustrated, additional components not illustrated herein, or some combination of the components illustrated and additional components. Computer system 500 may be or include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 6:
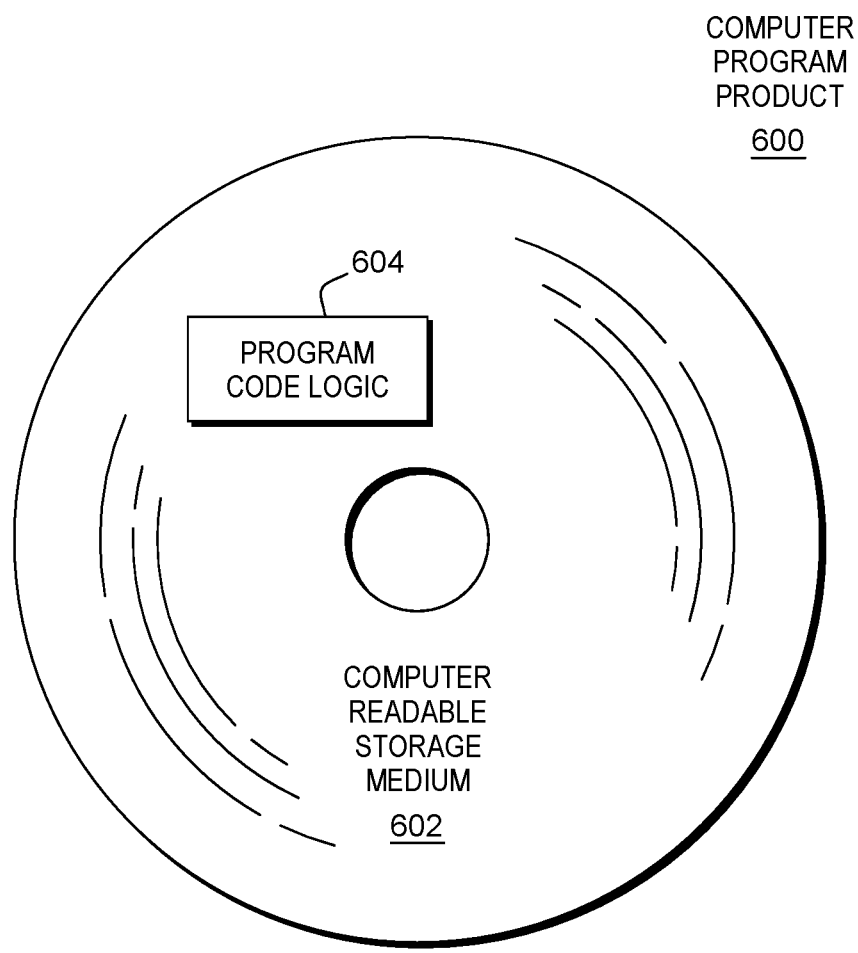
FIG. 6 depicts one embodiment of a computer program product.

Referring to FIG. 6, in one example, a computer program product 600 includes, for instance, one or more computer readable storage media 602 to store computer readable program code means, logic and/or instructions 604 thereon to provide and facilitate one or more embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
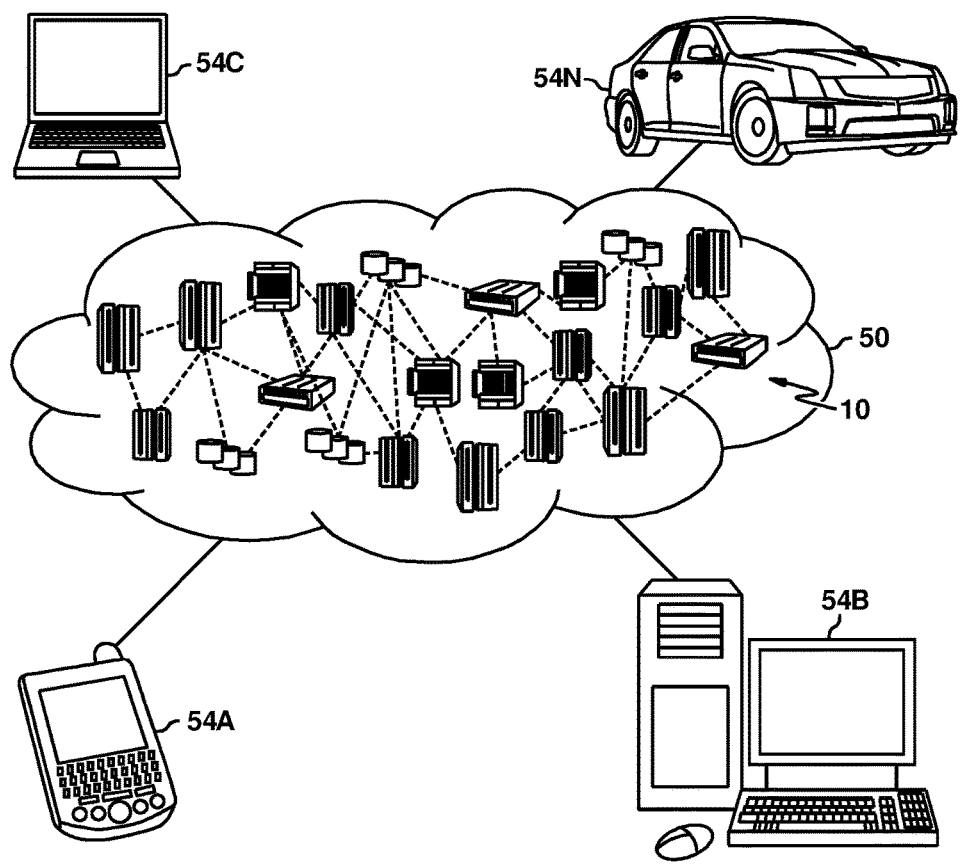
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
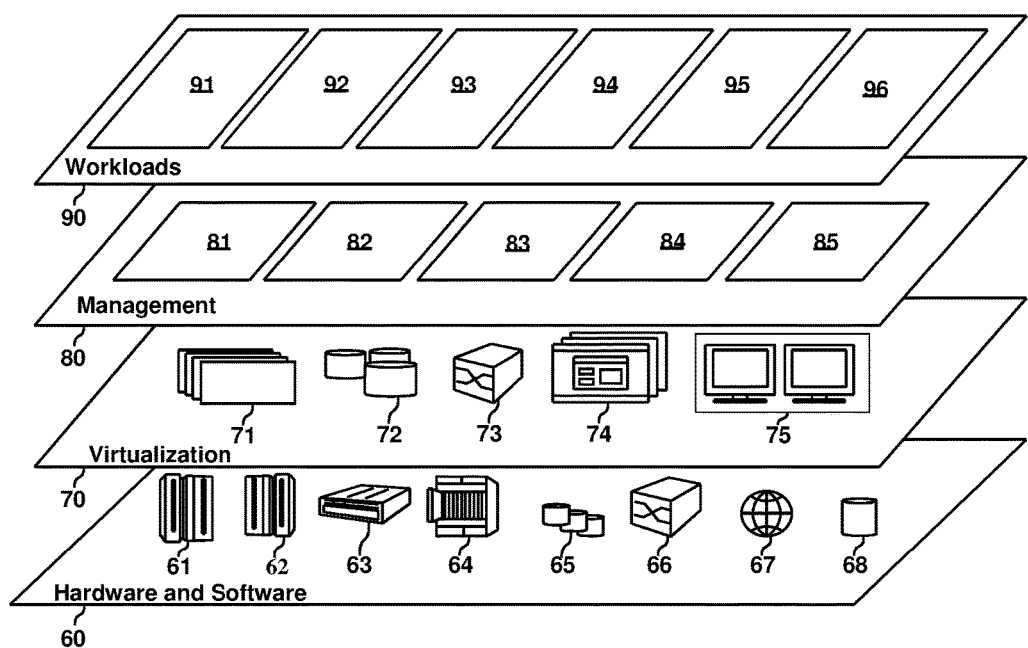
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and confusion reduction in social media messages of online social networks 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   identifying elements in social media message content, the social media message content comprising a posted message posted to a social media platform;
   determining whether the social media message content is indefinite as to an audience being targeted, the determining whether the social media message content is indefinite as to an audience being targeted comprising predicting a likelihood of confusion based on the social media message content, wherein the prediction of the likelihood of confusion is based on an age of the posted message, in which the older the post, the higher the predicted likelihood of confusion;

determining, based on the identified elements, a plurality of different candidate audiences to which the social media message content is potentially targeted, each candidate audience of the plurality of difference candidate audiences ascertained based on a respective corresponding contextual understanding, of a plurality of different contextual understandings, given to the social media message content, wherein the determining the plurality of different candidate audiences comprises:

building a respective dictionary for each user of a plurality of users of a social media platform in which the social media message content is composed, wherein a dictionary for a given user of the plurality of users comprises elements include in prior-composed social media messages composed by the given user;

ascertaining a frequency of the elements included in prior-composed social media messages composed by each user;

building a clustered representation of the social media platform using k-means against the frequency of the elements;

querying a message space for social media messages based on the social media message content; and identifying dense k-clusters based on the social media message content, the dense k-clusters corresponding to the plurality of different candidate audiences;

indicating to a user the plurality of candidate audiences and, for each candidate audience of the plurality of different candidate audiences, a suggested one or more additional elements to apply to the social media message content to provide additional context for the social media message content and thereby tailor the social media message content to an audience of the plurality of different candidate audiences and corresponding contextual understanding; and modifying the social media message content with the one or more additional elements for a target audience of the plurality of different candidate audiences, the modifying adding the one or more additional elements to the social media message content and targeting the social media message content to the target audience.

2. The method of claim 1, further comprising:
identifying a communications channel identified in the social media message content; and
obtaining at least some of the suggested additional elements from other messages identifying the communications channel.

3. The method of claim 1, further comprising:
presenting an interface through which the user selects the one or more additional elements with which the social media message content is modified, the interface presenting selectable indications of the plurality of different candidate audiences, and, for each audience of the plurality of different candidate audiences, the respective one or more additional elements to augment the social media message content to target the social media message content;
receiving via the interface user selections of the one or more additional elements with which to modify the social media message content; and performing the modifying based on receiving the user selections, wherein the social media message content is augmented with the user selections of the one or more additional elements.

4. The method of claim 1, wherein the identified elements comprise natural language elements and one or more metadata tags of the social media message content.

5. The method of claim 1, wherein at least one of the respective one or more additional elements for a candidate audience comprises a metadata tag.

6. The method of claim 1, wherein the social media message content is selected from the group consisting of: a social media post, a comment to a social media post, a message between users in a social media platform, and a forum post.

7. The method of claim 1, wherein the social media message content comprises a message not yet posted to a social media platform for which the social media message content is composed, and wherein the method performs the modifying the social media message content prior to posting the social media message content as the message to the social media platform.

8. A computer program product comprising:
a computer readable storage medium readable by a processing circuit and storing instructions for execution by the processing circuit for performing a method comprising:

identifying elements in social media message content, the social media message content comprising a posted message posted to a social media platform;

determining whether the social media message content is indefinite as to an audience being targeted, the determining whether the social media message content is indefinite as to an audience being targeted comprising predicting a likelihood of confusion based on the social media message content, wherein the prediction of the likelihood of confusion is based on an age of the posted message, in which the older post, the higher the predicted likelihood of confusion;

determining, based on the identified elements, a plurality of different candidate audiences to which the social media message content is potentially targeted, each candidate audience of the plurality of difference candidate audiences ascertained based on a respective corresponding contextual understanding, of a plurality of different contextual understandings, given to the social media message content, wherein the determining the plurality of different candidate audiences comprises:

building a respective dictionary for each user of a plurality of users of a social media platform in which the social media message content is composed, wherein a dictionary for a given user of the plurality of users comprises elements included in prior-composed social media messages composed by the given user;

ascertaining a frequency of the elements included in prior-composed social media message composed by each user;

building a clustered representation of the social media platform using k-means against the frequency of the elements;

querying a message space for social media messages based on the social media message content; and identifying dense k-clusters based on the social media message content, the dense k-clusters corresponding to the plurality of different candidate audiences;

indicating to a user the plurality of candidate audiences and, for each candidate audience of the plurality of different candidate audiences, a suggested one or more additional elements to apply to the social media message content to provide additional context for the social media message content and thereby tailor the social media message content to an audience of the plurality of different candidate audiences and corresponding contextual understanding; and modifying the social media message content with the one or more additional elements for a target audience of the plurality of different candidate audiences, the modifying adding the one or more additional elements to the social media message content and targeting the social media message content to the target audience.

9. The computer program product of claim 8, wherein the method further comprises:

identifying a communications channel identified in the social media message content; and obtaining at least some of the suggested additional elements from other messages identifying the communications channel.

10. The computer program product of claim 8, wherein the social media message content comprises a message not yet posted to a social media platform for which the social media message content is composed, and wherein the method performs the modifying the social media message content prior to posting the social media message content as the message to the social media platform.

11. A computer system comprising:

a memory; and a processor in communication with the memory, wherein the computer system is configured to perform a method, the method comprising:

identifying elements in social media message content, the social media message content comprising a posted message posted to a social media platform;

determining whether the social message content is indefinite as to an audience being targeted, the determining whether the social media message content is indefinite as to an audience being targeted comprising predicting a likelihood of confusion based on the social media message content, wherein the prediction of the likelihood of confusion is based on an age of the posted message, in which the older post, the higher the predicted likelihood of confusion;

determining, based on the identified elements, a plurality of different candidate audiences to which the social media message content is potentially targeted, each candidate audience of the plurality of difference candidate audiences ascertained based on a respective corresponding contextual understanding, of a plurality of different contextual understandings, given to the social media message content, wherein the determining the plurality of different candidate audiences comprises:

building a respective dictionary for each user of a plurality of users of a social media platform in which the social media message content is composed, wherein a dictionary for a given user of the plurality of users comprises elements included in prior-composed social media messages composed by the given user;

ascertaining a frequency of the elements included in prior-composed social media messages composed by each user;

building a clustered representation of the social media platform using k-means against the frequency of the elements;

querying a message space for social media messages based on the social media message content; and identifying dense k-clusters based on the social media message content, the dense k-clusters corresponding to the plurality of different candidate audiences;

indicating to a user the plurality of candidate audiences and, for each candidate audience of the plurality of different candidate audiences, a suggested one or more additional elements to apply to the social media message content to provide additional context for the social media message content and thereby tailor the social media message content to an audience of the plurality of different candidate audiences and corresponding contextual understanding; and modifying the social media message content with the one or more additional elements for a target audience of the plurality of different candidate audiences, the modifying adding the one or more additional elements to the social media message content and targeting the social media message content to the target audience.

12. The computer system of claim 11, wherein the method further comprises:

identifying a communications channel identified in the social media message content; and obtaining at least some of the suggested additional elements from other messages identifying the communications channel.

13. The computer system of claim 11, wherein the social media message content comprises a message not yet posted to a social media platform for which the social media message content is composed, and wherein the method performs the modifying the social media message content prior to posting the social media message content as the message to the social media platform.

* * * * *